US012522256B2

(12) United States Patent
Oba

(10) Patent No.: US 12,522,256 B2
(45) Date of Patent: Jan. 13, 2026

(54) DRIVE CONTROL DEVICE AND DRIVE DEVICE FOR RAILWAY VEHICLE

(71) Applicant: Mitsubishi Electric Corporation, Tokyo (JP)

(72) Inventor: Tomohiro Oba, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1015 days.

(21) Appl. No.: 17/601,601

(22) PCT Filed: Apr. 10, 2019

(86) PCT No.: PCT/JP2019/015692
§ 371 (c)(1),
(2) Date: Oct. 5, 2021

(87) PCT Pub. No.: WO2020/208755
PCT Pub. Date: Oct. 15, 2020

(65) Prior Publication Data
US 2022/0177011 A1 Jun. 9, 2022

(51) Int. Cl.
*B61C 7/04* (2006.01)
*B60L 50/40* (2019.01)
*B60L 58/13* (2019.01)

(52) U.S. Cl.
CPC .............. *B61C 7/04* (2013.01); *B60L 58/13* (2019.02); *B60L 2200/26* (2013.01); *B60L 2220/20* (2013.01)

(58) Field of Classification Search
CPC ........ B61C 7/04; B60L 58/13; B60L 2200/26; B60L 2200/20; B60L 2200/42; B60L 50/40; B60L 50/13
See application file for complete search history.

(56) References Cited

U.S. PATENT DOCUMENTS 5,629,596 A 5/1997 Ijima et al.
8,324,747 B2 * 12/2012 Anghel ................... F02N 11/04
290/31
(Continued)

FOREIGN PATENT DOCUMENTS

EP 2055547 A1 5/2009
JP 2008049811 A 3/2008
(Continued)

OTHER PUBLICATIONS

International Search Report (PCT/ISA/210) with translation and Written Opinion (PCT/ISA/237) mailed on Jun. 4, 2019, by the Japan Patent Office as the International Searching Authority for International Application No. PCT/JP2019/015692. (9 pages).
(Continued)

*Primary Examiner* — David P. Merlino
*Assistant Examiner* — Mahmoud M Kazimi
(74) *Attorney, Agent, or Firm* — .Buchanan Ingersoll & Rooney PC

(57) ABSTRACT

A drive control device includes a self-excited generator to generate and output electric power by being driven by an internal combustion engine, and a separately excited generator to generate and output electric power by being driven by the internal combustion engine when the separately excited generator is in an excited state. The drive control device further includes a first power converter to convert electric power fed from the separately excited generator via primary terminals into DC power and output the DC power via secondary terminals or to convert DC power fed via the secondary terminals into electric power to be fed to the separately excited generator and output the electric power via the primary terminals, and a capacitor connected between the secondary terminals of the first power converter.

20 Claims, 9 Drawing Sheets

(56) References Cited

U.S. PATENT DOCUMENTS

| | | | | |
|---|---|---|---|---|
| 8,581,425 B2 * | 11/2013 | Rozman | ............... | F02N 11/04 |
| | | | | 322/14 |
| 2007/0012492 A1 * | 1/2007 | Deng | ............... | B60L 50/13 |
| | | | | 180/65.1 |

FOREIGN PATENT DOCUMENTS

| JP | 2008543674 A | 12/2008 |
|---|---|---|
| JP | 5401213 B2 * | 1/2014 |
| JP | 2018149882 A | 9/2018 |

OTHER PUBLICATIONS

Office Action dated Mar. 9, 2022, issued in corresponding Indian Patent Application No. 202127044956, 5 pages.

* cited by examiner

DRIVE CONTROL DEVICE AND DRIVE DEVICE FOR RAILWAY VEHICLE

TECHNICAL FIELD

The present disclosure relates to a drive control device and a driving apparatus for a railway vehicle.

BACKGROUND ART

Some of the driving apparatuses for vehicles that drive railway vehicles include electric generators and motors. A typical example of such driving apparatuses for vehicles is disclosed in Patent Literature 1. The driving apparatus for a vehicle disclosed in Patent Literature 1 includes an internal combustion engine, an induction generator driven by the internal combustion engine, a power converter to drive an induction motor using electric power generated at the induction generator, and an electric storage device including a secondary battery. The power generation at the induction generator driven by the internal combustion engine requires electric power to be fed to the induction generator and excite the induction generator. In this driving apparatus for a vehicle, the power converter converts direct current (DC) power fed from the electric storage device into alternating current (AC) power and feeds the AC power to the induction generator. The fed AC power excites the induction generator, and the induction generator generates electric power by being driven by the internal combustion engine, and feeds the generated electric power to the power converter. The power converter then converts the electric power fed from the induction generator into electric power for driving the induction motor, and feeds the converted electric power to the induction motor. The fed electric power drives the induction motor, thereby providing thrust for a railway vehicle.

CITATION LIST

Patent Literature

Patent Literature 1: Unexamined Japanese Patent Application Publication No. 2008-49811

SUMMARY OF INVENTION

Technical Problem

The electric storage device is required to include a charge-discharge controlling unit to control charge and discharge of the secondary battery, a monitoring unit to monitor whether an overvoltage of the secondary battery occurs, and a housing to accommodate components, such as the secondary battery, the charge-discharge controlling unit, and the monitoring unit, and thus unfortunately has a large size.

An objective of the present disclosure, which has been accomplished in view of the above situations, is to provide a small drive control device and a small driving apparatus for a railway vehicle.

Solution to Problem

In order to achieve the above objective, a drive control device according to an aspect of the present disclosure includes a self-excited generator, a separately excited generator, a first power converter, and a capacitor. The self-excited generator is coupled to an internal combustion engine and, by being driven by the internal combustion engine, generates electric power and outputs the generated electric power. The separately excited generator is coupled to the internal combustion engine. The separately excited generator in an excited state is configured to generate electric power and output the generated electric power by being driven by the internal combustion engine. The first power converter converts electric power fed from the separately excited generator via primary terminals into DC power and outputs the DC power via secondary terminals, or converts DC power fed via the secondary terminals into electric power to be fed to the separately excited generator and outputs the electric power via the primary terminals. The capacitor is connected between the secondary terminals of the first power converter. The self-excited generator has output terminals connected to the capacitor.

Advantageous Effects of Invention

According to an aspect of the present disclosure, the capacitor connected between the secondary terminals of the first power converter is also connected to the output terminals of the self-excited generator. The first power converter thus converts the DC power, which is fed via the secondary terminals from the capacitor connected to the output terminals of the self-excited generator, into electric power to be fed to the separately excited generator, and outputs the electric power via the primary terminals. The electric power fed from the first power converter excites the separately excited generator. The drive control device therefore requires no electric storage device to feed electric power for exciting the separately excited generator. This configuration can reduce the size of the drive control device.

DESCRIPTION OF EMBODIMENTS

Figure 1:
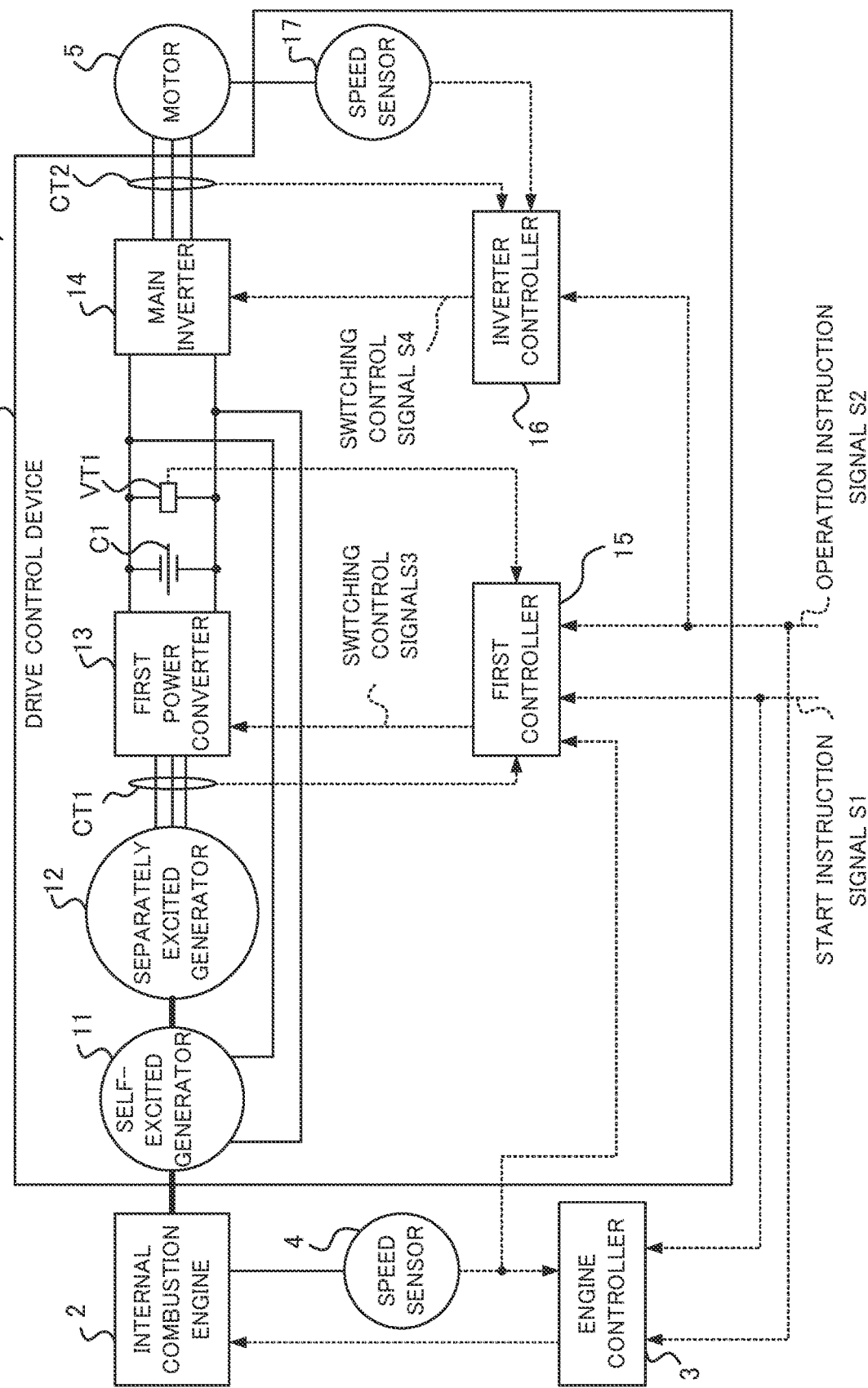
FIG. 1 is a block diagram illustrating a configuration of a driving apparatus for a railway vehicle according to Embodiment 1 of the present disclosure.

A drive control device and a driving apparatus for a railway vehicle according to embodiments of the present disclosure are described in detail below with reference to the accompanying drawings. In the drawings, the components identical or corresponding to each other are provided with the same reference symbol.

Embodiment 1

FIG. 1 illustrates a driving apparatus for a railway vehicle that drives a railway vehicle by means of electric generators and a motor. A driving apparatus 1 for a railway vehicle (hereinafter referred to as "driving apparatus 1") includes an internal combustion engine 2, which is a power source, an engine controller 3 to control the internal combustion engine 2, a speed sensor 4 to detect a rotation frequency of the internal combustion engine 2, a drive control device 10 driven by the internal combustion engine 2 to feed generated electric power to a motor 5, and the motor 5 driven by the electric power fed from the drive control device 10 to provide thrust for the railway vehicle.

The internal combustion engine 2 includes a diesel or gasoline engine, for example. The internal combustion engine 2 includes a starter. The output shaft of the internal combustion engine 2 is coupled to the individual input shafts of a self-excited generator 11 and a separately excited generator 12 included in the drive control device 10, which are described below. The rotation of the internal combustion engine 2 thus individually drives the self-excited generator 11 and the separately excited generator 12 to generate power.

The engine controller 3 is fed with a start instruction signal S1 from a start switch provided in a cab, which is not illustrated, and fed with an operation instruction signal S2 from a master controller provided in the cab. The start instruction signal S1 indicates an instruction for start of the internal combustion engine 2. The start instruction signal S1 is switched to a low (L) level to stop the internal combustion engine 2, and switched to a high (H) level to start the internal combustion engine 2. The operation instruction signal S2 indicates a power running notch for designating an acceleration of the railway vehicle, or a braking notch for designating a deceleration of the railway vehicle, for example.

The engine controller 3 starts the internal combustion engine 2 in response to switching of the start instruction signal S1 to the H level. In detail, the engine controller 3 outputs a control signal to the starter and activates the starter in response to switching of the start instruction signal S1 to the H level. The torque of the starter is then transmitted to the internal combustion engine 2, thereby starting the internal combustion engine 2.

After the start of the internal combustion engine 2, the engine controller 3 controls the internal combustion engine 2 on the basis of the target rotation frequency corresponding to the power running notch indicated by the operation instruction signal S2, such that the actual rotation frequency of the internal combustion engine 2 acquired from the speed sensor 4 approaches the target rotation frequency. The engine controller 3 preliminarily retains values of target rotation frequencies corresponding to the individual power running notches.

The speed sensor 4 includes a pulse generator (PG) mounted on the internal combustion engine 2. The speed sensor 4 calculates a rotation frequency of the internal combustion engine 2 from the pulse signal output from the PG, and outputs a signal indicating the rotation frequency of the internal combustion engine 2. Specifically, the speed sensor 4 counts the number of pulses of the pulse signal in certain time intervals, and then calculates a rotation frequency of the internal combustion engine 2 from the counted number of pulses within the certain time.

The motor 5 includes a three-phase induction motor. The motor 5 is driven by alternating current (AC) power and thus rotates. The AC power is output from a main inverter 14, which is described below, included in the drive control device 10. The motor 5 is coupled to an axle via a joint, for example, and transmits the torque to the axle.

The drive control device 10 includes the self-excited generator 11 and the separately excited generator 12. The self-excited generator 11 is driven by the internal combustion engine 2 to rotate, and thereby generates direct current (DC) power and outputs the generated DC power. The separately excited generator 12 is driven by the internal combustion engine 2 to rotate, and thereby generates AC power and outputs the generated AC power. The drive control device 10 further includes a first power converter 13 to convert the AC power fed from the separately excited generator 12 via the primary terminals into DC power and output the DC power via the secondary terminals, the main inverter 14 to convert the DC power fed from the first power converter 13 via the primary terminals into three-phase AC power and output the three-phase AC power via the secondary terminals, and a capacitor C1 connected between the secondary terminals of the first power converter 13.

The drive control device 10 further includes a first controller 15 to control the first power converter 13, and an inverter controller 16 to control the main inverter 14. The drive control device 10 further includes a current measurer CT1 connected to the primary terminals of the first power converter 13 to measure respective values of the U-, V-, and W-phase currents flowing in the circuitry between the separately excited generator 12 and the first power converter 13, a current measurer CT2 to measure respective values of the U-, V-, and W-phase currents flowing from the main inverter 14 to the motor 5, and a voltage measurer VT1 connected in parallel to the capacitor C1 to measure a value of voltage between the terminals of the capacitor C1.

The self-excited generator 11 includes a DC generator. The input shaft of the self-excited generator 11 is coupled to the output shaft of the internal combustion engine 2. The self-excited generator 11 generates DC power and outputs the generated DC power by being driven by the internal combustion engine 2. The output terminals of the self-excited generator 11 are connected to both ends of the capacitor C1. The DC power output from the self-excited generator 11 thus charges the capacitor C1 while the separately excited generator 12 is not excited and not generating power.

The self-excited generator 11 preferably has a generation capacity lower than the generation capacity of the separately excited generator 12.

The separately excited generator 12 is excited by electric power fed from the first power converter 13. The input shaft of the separately excited generator 12 is coupled to the output shaft of the internal combustion engine 2. The separately excited generator 12 in an excited state generates AC power and outputs the generated AC power by being driven by the internal combustion engine 2.

The primary terminals of the first power converter 13 are connected to the separately excited generator 12, while the secondary terminals are connected to the main inverter 14. The first power converter 13 operates under the control of the first controller 15. The first power converter 13 is fed with DC power via the secondary terminals from the capacitor C1 charged immediately after the start of the internal combustion engine 2, converts the DC power into AC power, feeds the AC power via the primary terminals to the separately excited generator 12, and thus excites the separately excited generator 12. After the excitation of the separately excited generator 12, the rotation of the internal combustion engine 2 causes the separately excited generator 12 to start power generation. After the start of power generation at the separately excited generator 12, the first power converter 13 converts the AC power fed from the separately excited generator 12 via the primary terminals into DC power, and feeds the DC power to the main inverter 14 via the secondary terminals, under the control of the first controller 15.

The main inverter 14 converts the DC power output from the secondary terminals of the first power converter 13 into three-phase AC power, and outputs the three-phase AC power to the motor 5, under the control of the inverter controller 16. The motor 5 is thus driven by the three-phase AC power output from the main inverter 14 and rotates. The main inverter 14 includes a variable voltage variable frequency (VVVF) inverter.

A speed sensor 17 includes a PG mounted on the motor 5. The speed sensor 17 calculates a rotation frequency of the motor 5 from the pulse signal output from the PG and outputs a signal indicating the rotation frequency of the motor 5, like the speed sensor 4.

The first controller 15 is fed with the start instruction signal S1 and the operation instruction signal S2. The first controller 15 acquires a voltage between the terminals of the capacitor C1 from the voltage measurer VT1. The first controller 15 also acquires respective values of the U-, V-, and W-phase currents flowing in the circuitry between the separately excited generator 12 and the first power converter 13 from the current measurer CT1.

In accordance with the start instruction signal S1 and the operation instruction signal S2, the first controller 15 outputs a switching control signal S3 for controlling timings of turning on and off a plurality of switching elements of the first power converter 13. Specifically, the first controller 15 causes the first power converter 13 to function as a DC-AC converter or an AC-DC converter. The DC-AC converter converts the DC power, which is fed from the capacitor C1 charged with the DC power generated at the self-excited generator 11, into AC power. The AC-DC converter converts the AC power fed from the separately excited generator 12 into DC power.

Specifically, the first controller 15 stops the first power converter 13 when the start instruction signal S1 is at the L level and the operation instruction signal S2 indicates a braking instruction.

When the start instruction signal S1 is at the H level and the voltage between the terminals of the capacitor C1 reaches a threshold voltage EFC1, the first controller 15 controls the first power converter 13. The first controller 15 causes the first power converter 13 to convert the DC power, which is fed from the capacitor C1 charged with the DC power generated at the self-excited generator 11, into AC power and to feed the AC power to the separately excited generator 12. The fed AC power excites the separately excited generator 12. The threshold voltage EFC1 is defined as a voltage that can achieve excitation of the separately excited generator 12. The first controller 15 preliminarily retains the value of the threshold voltage EFC1.

The first controller 15 determines whether the amplitude of the phase currents measured at the current measurer CT1 is at least a threshold amplitude. When the amplitude of the phase currents measured at the current measurer CT1 is at least the threshold amplitude, the separately excited generator 12 is deemed to be in an excited state. The threshold amplitude is defined to be lower than the possible amplitude of currents output from the separately excited generator 12 in an excited state. The first controller 15 preliminarily retains the value of the threshold amplitude.

When the amplitude of the phase currents measured at the current measurer CT1 is at least the threshold amplitude and the operation instruction signal S2 indicates a power running notch, the first controller 15 controls the timings of turning on and off the switching elements of the first power converter 13 on the basis of the voltage output from the separately excited generator 12 and the target voltage corresponding to the power running notch indicated by the operation instruction signal S2, such that the voltage output from the first power converter 13 approaches the target voltage. The first controller 15 preliminarily retains the values of target voltages corresponding to the individual power running notches.

The inverter controller 16 is fed with the operation instruction signal S2. The inverter controller 16 acquires a rotation frequency of the motor 5 from the speed sensor 17. The inverter controller 16 also acquires values of the phase currents flowing in the motor 5 from the current measurer CT2. In accordance with the operation instruction signal S2, the rotation frequency of the motor 5, and the phase currents flowing in the motor 5, the inverter controller 16 outputs a switching control signal S4 for controlling timings of turning on and off a plurality of switching elements of the main inverter 14.

Specifically, the inverter controller 16 calculates a target torque of the motor 5, on the basis of the power running notch indicated by the operation instruction signal S2 and the rotation frequency of the motor 5 acquired from the speed sensor 17. The inverter controller 16 also calculates an actual torque of the motor 5 from the values of the phase currents measured at the current measurer CT2. The inverter controller 16 then controls the switching elements of the main inverter 14 such that the actual torque of the motor 5 approaches the target torque.

An operation of the driving apparatus 1 having the above-described configuration is described below with reference to the timing chart in the sections (A) to (F) of FIG. 2.

Figure 2:
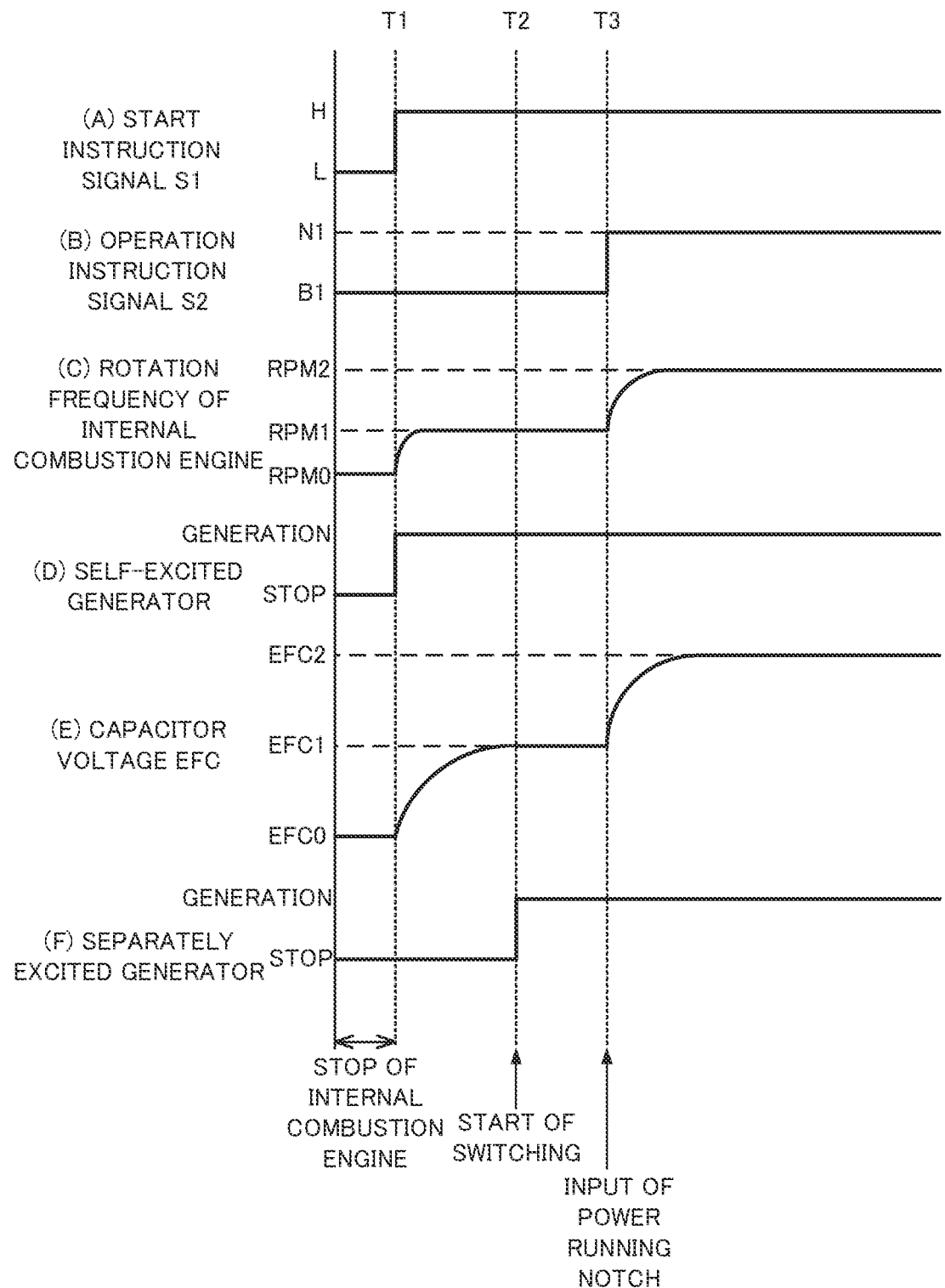
FIG. 2 is a timing chart illustrating a process of exciting a separately excited generator executed in the driving apparatus for a railway vehicle according to Embodiment 1.

As illustrated in the sections (A) and (B) of FIG. 2, the start instruction signal S1 is at the L level and the operation instruction signal S2 indicates a braking notch B1, during stop of the internal combustion engine 2. As illustrated in the section (C) of FIG. 2, the rotation frequency of the internal combustion engine 2 in the stop mode is defined as RPM0. As illustrated in the section (D) of FIG. 2, the self-excited generator 11 is stopped during stop of the internal combustion engine 2. As illustrated in the section (E) of FIG. 2, the capacitor C1 is in a discharged state during stop of the internal combustion engine 2, and the voltage between the terminals of the capacitor C1 in the discharged state is defined as EFC0. As illustrated in the section (F) of FIG. 2, the separately excited generator 12 is stopped during stop of the internal combustion engine 2. In the examples described below, the timing of switching of the start instruction signal S1 from the L level to the H level is defined as time T1.

As illustrated in the section (C) of FIG. 2, the engine controller 3 starts the internal combustion engine 2, in response to switching of the start instruction signal S1 from the L level to the H level at the time T1. The rotation frequency of the internal combustion engine 2 thus starts to rise from the rotation frequency RPM0. The rotation frequency of the internal combustion engine 2 then reaches a rotation frequency RPM1. RPM1 indicates a rotation frequency of the internal combustion engine 2 when the operation instruction signal S2 indicates a braking notch after start of the internal combustion engine 2.

Figure 3:
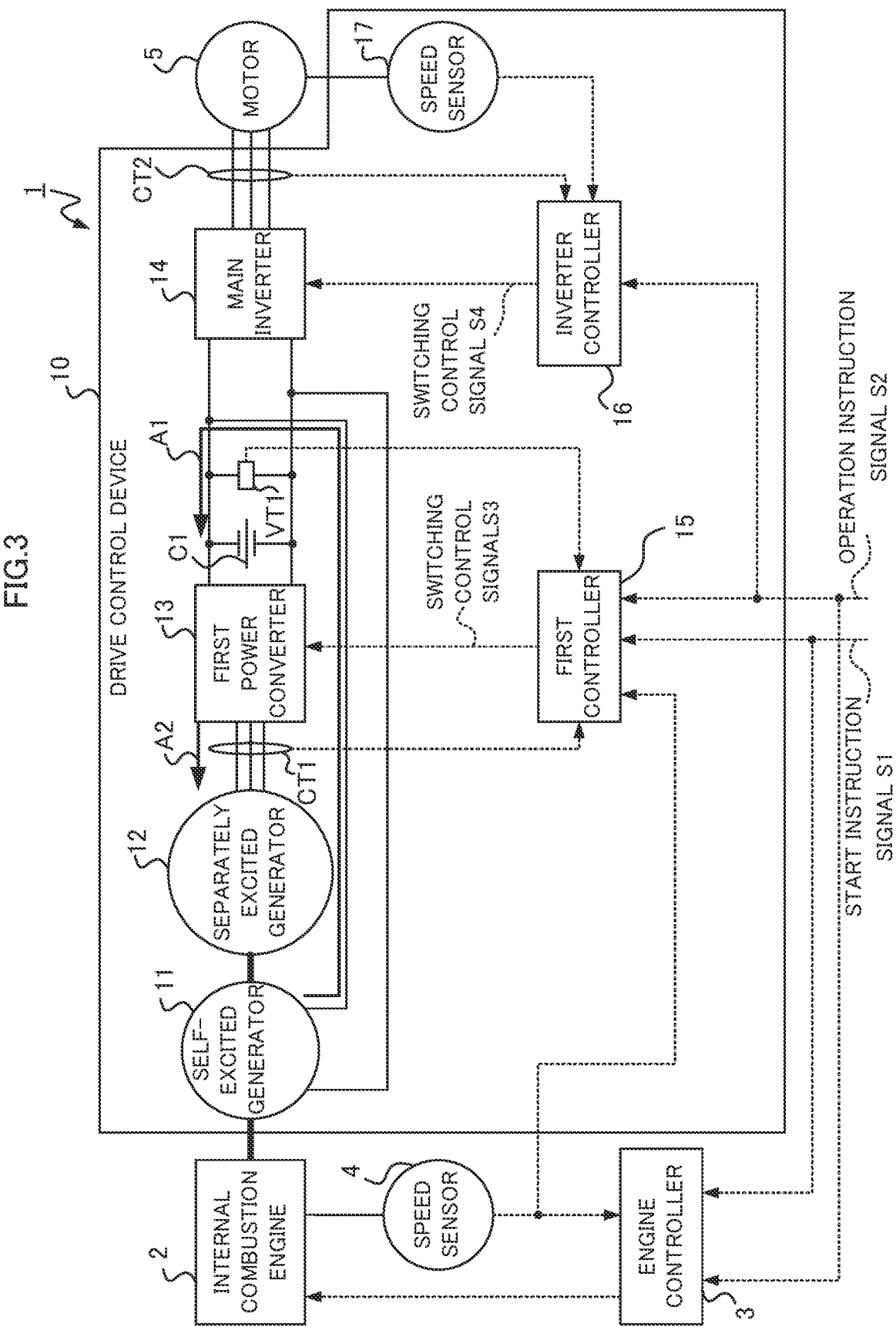
FIG. 3 illustrates an example of current flows in the driving apparatus for a railway vehicle according to Embodiment 1.

As illustrated in the section (D) of FIG. 2, the self-excited generator 11 driven by the internal combustion engine 2 starts power generation in accordance with an increase in the rotation frequency of the internal combustion engine 2. Accordingly, a current flows from the self-excited generator 11 to the capacitor C1 as represented by the solid-line arrow A1 in FIG. 3, thereby charging the capacitor C1. As illustrated in the section (E) of FIG. 2, the electric power generated at the self-excited generator 11 charges the capacitor C1, and the voltage EFC between the terminals of the capacitor C1 starts to rise from the voltage EFC0. As illustrated in the section (F) of FIG. 2, the separately excited generator 12 has not been excited and thus does not start power generation regardless of being driven by the internal combustion engine 2.

The first controller 15 is monitoring the voltage between the terminals of the capacitor C1 on the basis of the signal output from the voltage measurer VT1. As illustrated in the section (E) of FIG. 2, the first controller 15 determines that the voltage EFC between the terminals reaches the threshold voltage EFC1 at a time T2. When determining that the voltage EFC between the terminals of the capacitor C1 reaches the threshold voltage EFC1, the first controller 15 starts to control the on and off states of the switching elements of the first power converter 13, and causes the first power converter 13 to convert the DC power fed from the capacitor C1 into AC power and feed the AC power to the separately excited generator 12. Accordingly, a current flows from the first power converter 13 to the separately excited generator 12 as represented by the solid-line arrow A2 in FIG. 3, thereby exciting the separately excited generator 12. As illustrated in the section (F) of FIG. 2, after the excitation of the separately excited generator 12 at the time T2, the separately excited generator 12 driven by the internal combustion engine 2 starts power generation. The separately excited generator 12 then feeds the generated AC power to the first power converter 13.

The first controller 15 is monitoring the amplitude of currents flowing between the separately excited generator 12 and the first power converter 13, on the basis of the signal output from the current measurer CT1. After the excitation of the separately excited generator 12 at the time T2, the amplitude of the phase currents measured at the current measurer CT1 becomes at least the threshold amplitude. When determining that the amplitude of the phase currents measured at the current measurer CT1 is at least the threshold amplitude, the first controller 15 controls the switching elements of the first power converter 13, and thereby causes the first power converter 13 to convert the AC power fed from the separately excited generator 12 into DC power and feed the DC power to the main inverter 14.

Then, a power running notch is input from the master controller, and the operation instruction signal S2 thus starts to indicate a power running notch N1. This timing is defined as time T3. After the time T3, the engine controller 3 controls the internal combustion engine 2 such that the rotation frequency of the internal combustion engine 2 approaches a rotation frequency RPM2 corresponding to the power running notch N1. This control increases the rotation frequency to the rotation frequency RPM2, as illustrated in the section (C) of FIG. 2. The increase in the rotation frequency of the internal combustion engine 2 also raises the rotation frequencies and output voltages of the self-excited generator 11 and the separately excited generator 12.

In response to the operation instruction signal S2 indicating the power running notch N1, the first controller 15 controls the on and off states of the switching elements of the first power converter 13 such that the voltage output from the first power converter 13 approaches a voltage EFC2. The voltage EFC2 is a constant voltage corresponding to the power running notch N1 and is 600 V, for example. In detail, the first controller 15 calculates a voltage output from the separately excited generator 12, on the basis of the rotation frequency of the internal combustion engine 2 acquired from the speed sensor 4 and the values of the phase currents acquired from the current measurer CT1. The first controller 15 then controls the conduction ratios of the switching elements of the first power converter 13 on the basis of the voltage output from the separately excited generator 12 and the target voltage corresponding to the power running notch indicated by the operation instruction signal S2, such that the voltage output from the first power converter 13 approaches the target voltage.

The inverter controller 16 calculates an actual torque of the motor 5 on the basis of the values of the phase currents flowing in the motor 5, which are acquired from the current measurer CT2. The inverter controller 16 then controls the on and off states of the switching elements of the main inverter 14 such that the actual torque approaches the target torque corresponding to the power running notch N1. Accordingly, after the time T3, the motor 5 is driven in response to the operation instruction signal S2 and thus provides thrust for the railway vehicle. The inverter controller 16 preliminarily retains the values of target torques corresponding to the individual power running notches.

As described above, in the drive control device 10 according to Embodiment 1, the first power converter 13 converts the DC power, which is fed from the capacitor C1 charged with the electric power generated at the self-excited generator 11, into AC power and feeds the AC power to the separately excited generator 12, leading to excitation of the separately excited generator 12. The drive control device 10 therefore requires no electric storage device to excite the separately excited generator 12. This configuration can reduce the sizes of the drive control device 10 and the driving apparatus 1.

In the case where the self-excited generator 11 has a generation capacity lower than the generation capacity of the separately excited generator 12, the self-excited generator 11 may be such a small generator that can generate at least electric power for exciting the separately excited generator 12. This configuration can further reduce the sizes of the drive control device 10 and the driving apparatus 1.

Embodiment 2

Figure 4:
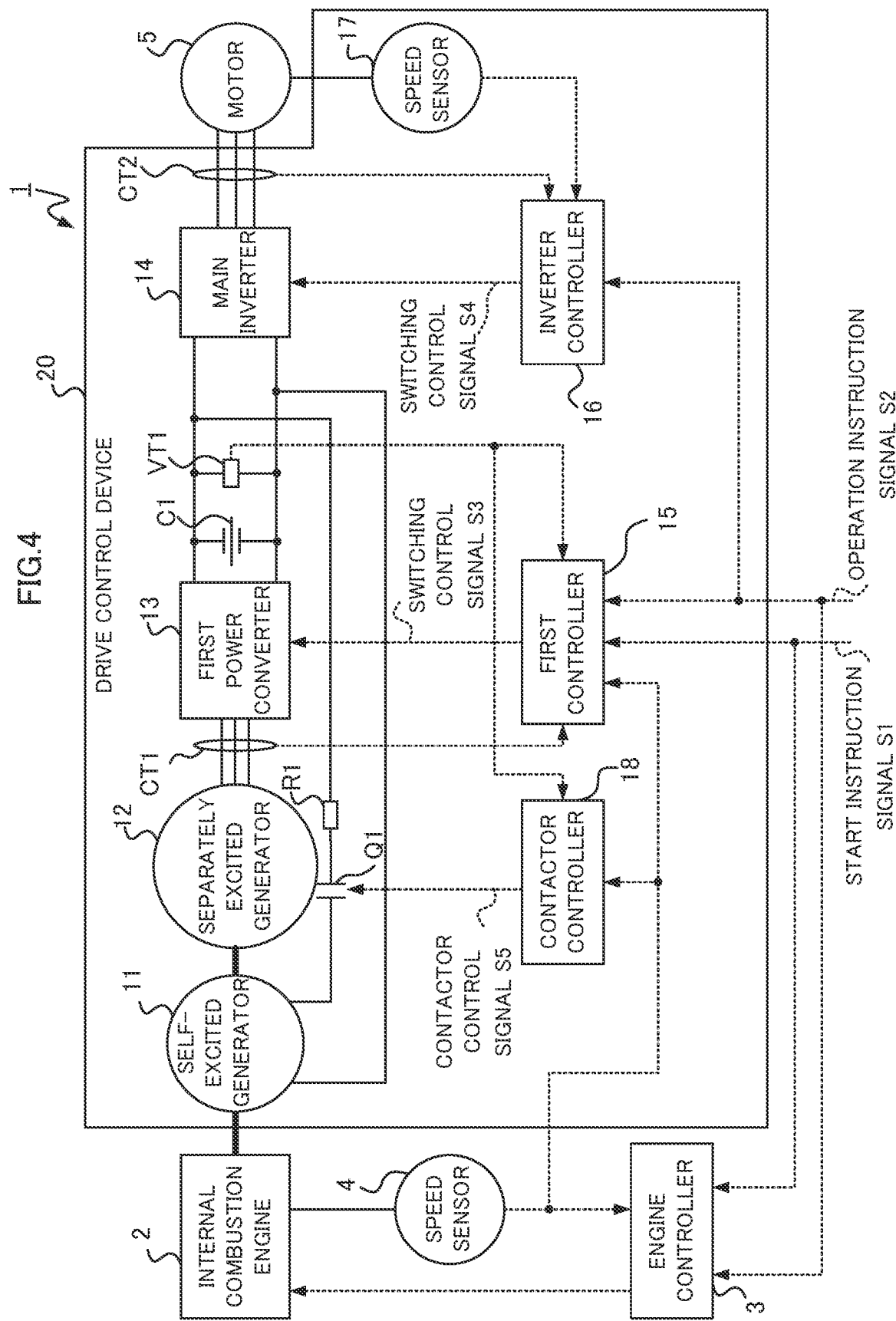
FIG. 4 is a block diagram illustrating a configuration of a driving apparatus for a railway vehicle according to Embodiment 2 of the present disclosure.

The drive control device 10 may have any circuit configuration provided that the capacitor C1 can be charged with electric power generated at the self-excited generator 11 and the electric power fed from the capacitor C1 can excite the separately excited generator 12. A drive control device 20 according to Embodiment 2 illustrated in FIG. 4 further includes a contactor Q1 having an end connected to one of the output terminals of the self-excited generator 11, a resistor R1 having an end connected to the other end of the contactor Q1 and having the other end connected to one end of the capacitor C1, and a contactor controller 18 to control the contactor Q1. The drive control device 20 has the structure identical to that of the drive control device 10, except for the contactor Q1, the resistor R1, and the contactor controller 18.

The contactor Q1 includes a DC electromagnetic contactor. The contactor Q1 is controlled by the contactor controller 18.

When the contactor controller 18 closes the contactor Q1, the one and other ends of the contactor Q1 are connected to each other. The resistor R1 is thus electrically connected to the self-excited generator 11. The capacitor C1 is then charged with the electric power generated at the self-excited generator 11. The resistor R1 can suppress an inrush current flowing into the capacitor C1 at the time of closing of the contactor Q1.

When the contactor controller 18 opens the contactor Q1, the one and other ends of the contactor Q1 are insulated from each other. The resistor R1 is thus electrically disconnected from the self-excited generator 11.

The contactor controller 18 outputs a contactor control signal S5 to the contactor Q1 and thereby closes or opens the contactor Q1. The contactor controller 18 acquires the actual rotation frequency of the internal combustion engine 2 from the speed sensor 4. When the actual rotation frequency of the internal combustion engine 2 reaches a threshold rotation frequency, the contactor controller 18 closes the contactor Q1. The threshold rotation frequency is defined as the rotation frequency of the internal combustion engine 2 when the self-excited generator 11 is driven by the internal combustion engine 2 to start power generation after the start of the internal combustion engine 2, for example.

The contactor controller 18 also acquires the voltage EFC between the terminals of the capacitor C1 from the voltage measurer VT1. After the closing of the contactor Q1, when the voltage EFC between the terminals of the capacitor C1 becomes at least the threshold voltage EFC1 that can achieve excitation of the separately excited generator 12, then the contactor controller 18 opens the contactor Q1. This configuration can suppress the electric power output from the self-excited generator 11 disturbing the output from the first power converter 13 provided by converting the AC power generated at the separately excited generator 12 into DC power.

An operation of the driving apparatus 1 having the above-described configuration is described below with reference to the timing chart in the sections (A) to (G) of FIG. 5. The sections (A) to (F) of FIG. 5 correspond to the respective sections (A) to (F) of FIG. 2. As in FIG. 2, the start instruction signal S1 is switched from the L level to the H level at the time T1.

Figure 5:
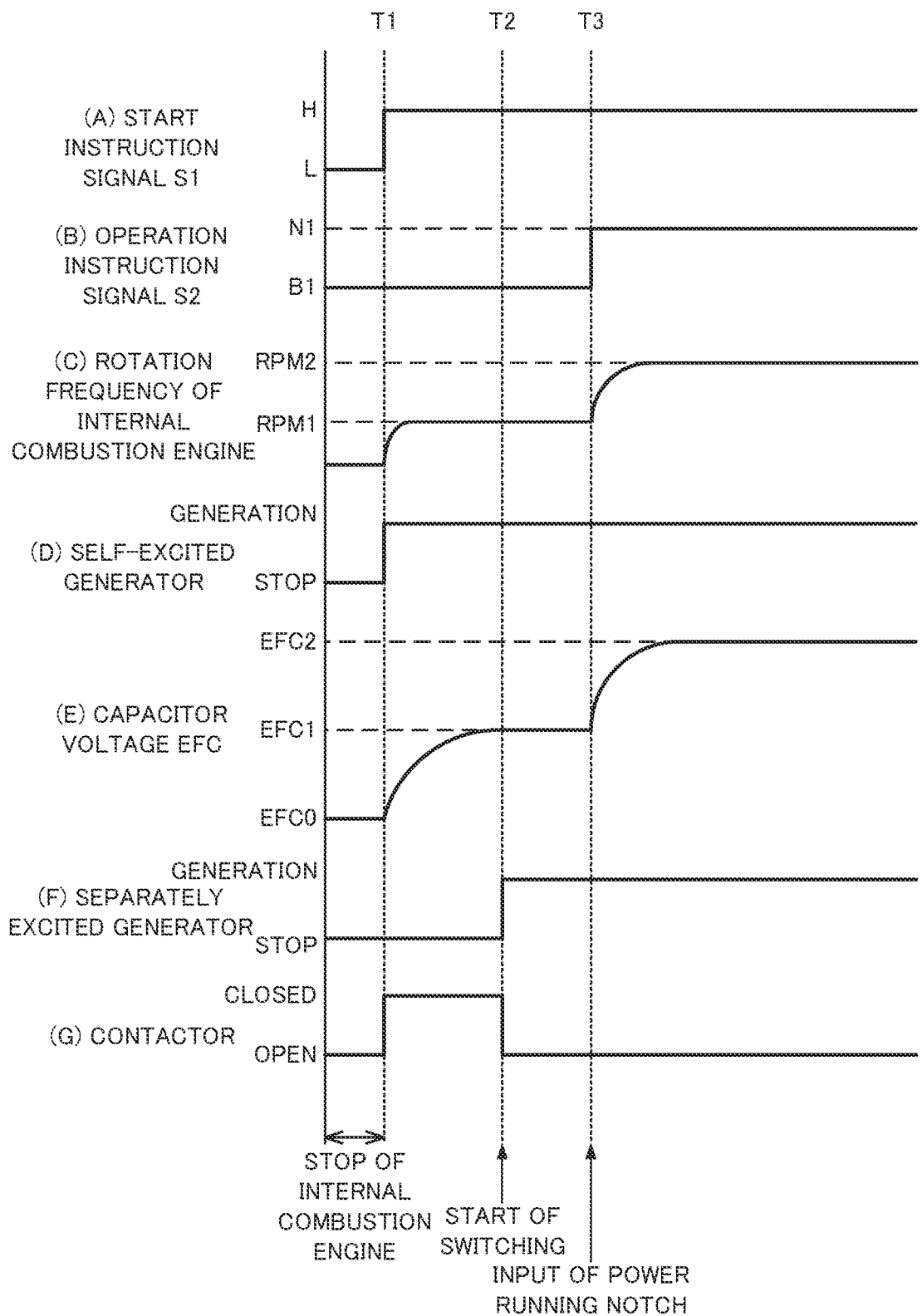
FIG. 5 is a timing chart illustrating a process of exciting a separately excited generator executed in the driving apparatus for a railway vehicle according to Embodiment 2.
Figure 6:
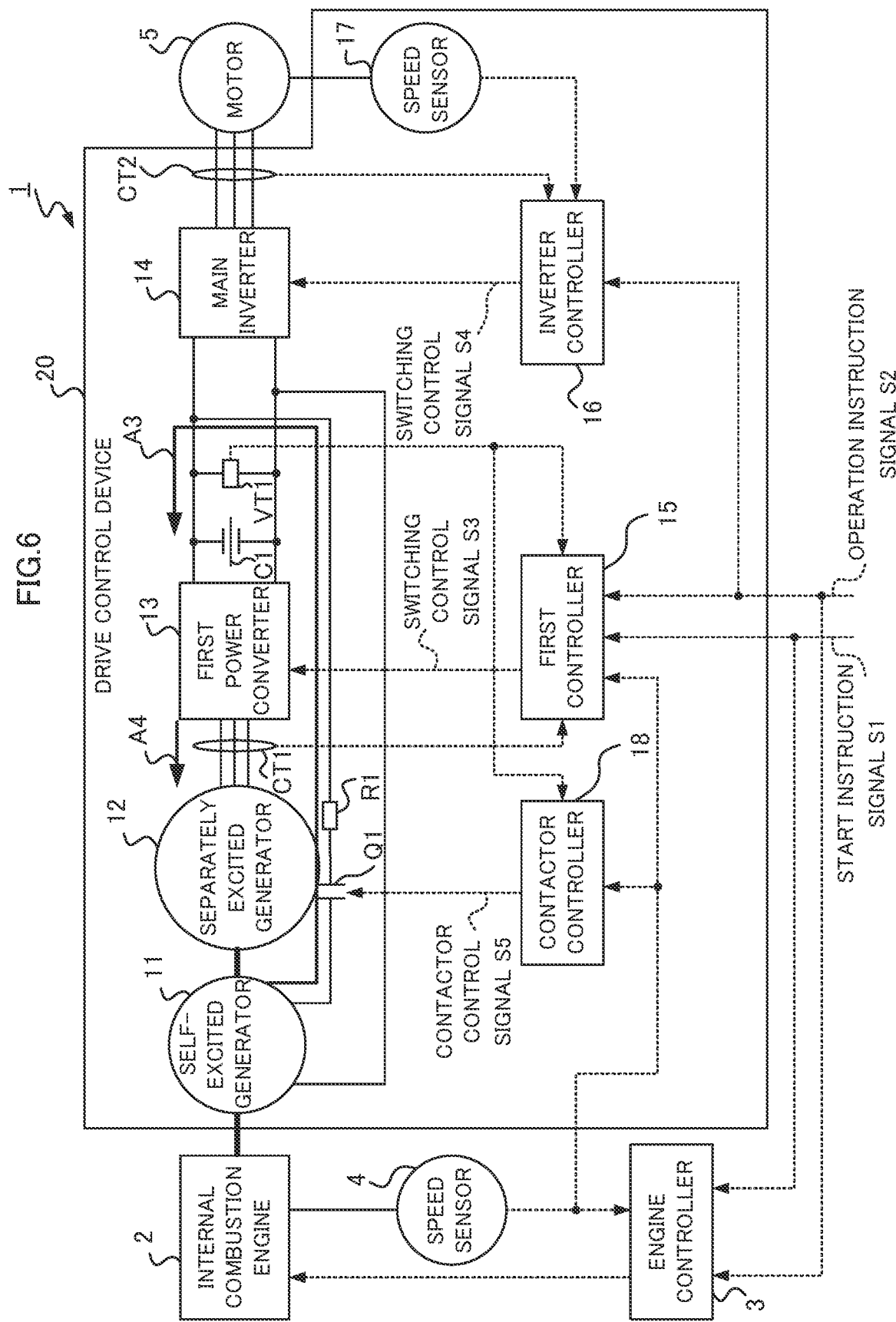
FIG. 6 illustrates an example of current flows in the driving apparatus for a railway vehicle according to Embodiment 2.

As illustrated in the section (C) of FIG. 5, the engine controller 3 starts the internal combustion engine 2 in response to switching of the start instruction signal S1 from the L level to the H level at the time T1. The rotation frequency of the internal combustion engine 2 thus starts to rise from the rotation frequency RPM0. As illustrated in the section (D) of FIG. 5, the self-excited generator 11 driven by the internal combustion engine 2 starts power generation in accordance with an increase in the rotation frequency of the internal combustion engine 2. As illustrated in the section (G) of FIG. 5, the contactor controller 18 closes the contactor Q1 at the time T1 in order to charge the capacitor C1 with electric power generated at the self-excited generator 11. Accordingly, a current flows from the self-excited generator 11 via the contactor Q1 to the capacitor C1 as represented by the solid-line arrow A3 in FIG. 6, thereby charging the capacitor C1. As illustrated in the section (E) of FIG. 5, the electric power generated at the self-excited generator 11 charges the capacitor C1, and the voltage EFC between the terminals of the capacitor C1 starts to rise from the voltage EFC0. As illustrated in the section (F) of FIG. 5, the separately excited generator 12 has not been excited and thus does not start power generation regardless of being driven by the internal combustion engine 2.

As illustrated in the section (E) of FIG. 5, when the voltage EFC between the terminals reaches the threshold voltage EFC1 at the time T2, the first controller 15 starts to control the on and off states of the switching elements of the first power converter 13, and causes the first power converter 13 to convert the DC power fed from the capacitor C1 into AC power and feed the AC power to the separately excited generator 12. Accordingly, a current flows from the first power converter 13 to the separately excited generator 12 as represented by the solid-line arrow A4 in FIG. 6, thereby exciting the separately excited generator 12. As illustrated in the section (F) of FIG. 5, after the excitation of the separately excited generator 12 at the time T2, the separately excited generator 12 driven by the internal combustion engine 2 starts power generation. The separately excited generator 12 then feeds the generated AC power to the first power converter 13.

When the voltage EFC between the terminals reaches the threshold voltage EFC1 at the time T2, the contactor controller 18 opens the contactor Q1 as illustrated in the section (G) of FIG. 5. The following steps are identical to those in Embodiment 1.

As described above, in the drive control device 20 according to Embodiment 2, the first power converter 13 converts the DC power, which is fed from the capacitor C1 charged with the electric power generated at the self-excited generator 11, into AC power and feeds the AC power to the separately excited generator 12, leading to excitation of the separately excited generator 12. The drive control device 20 therefore requires no electric storage device to excite the separately excited generator 12. This configuration can reduce the sizes of the drive control device 20 and the driving apparatus 1.

In the case where the self-excited generator 11 has a generation capacity lower than the generation capacity of the separately excited generator 12, the self-excited generator 11 may be such a small generator that can generate at least electric power for exciting the separately excited generator 12. This configuration can further reduce the sizes of the drive control device 20 and the driving apparatus 1.

Embodiment 3

Figure 7:
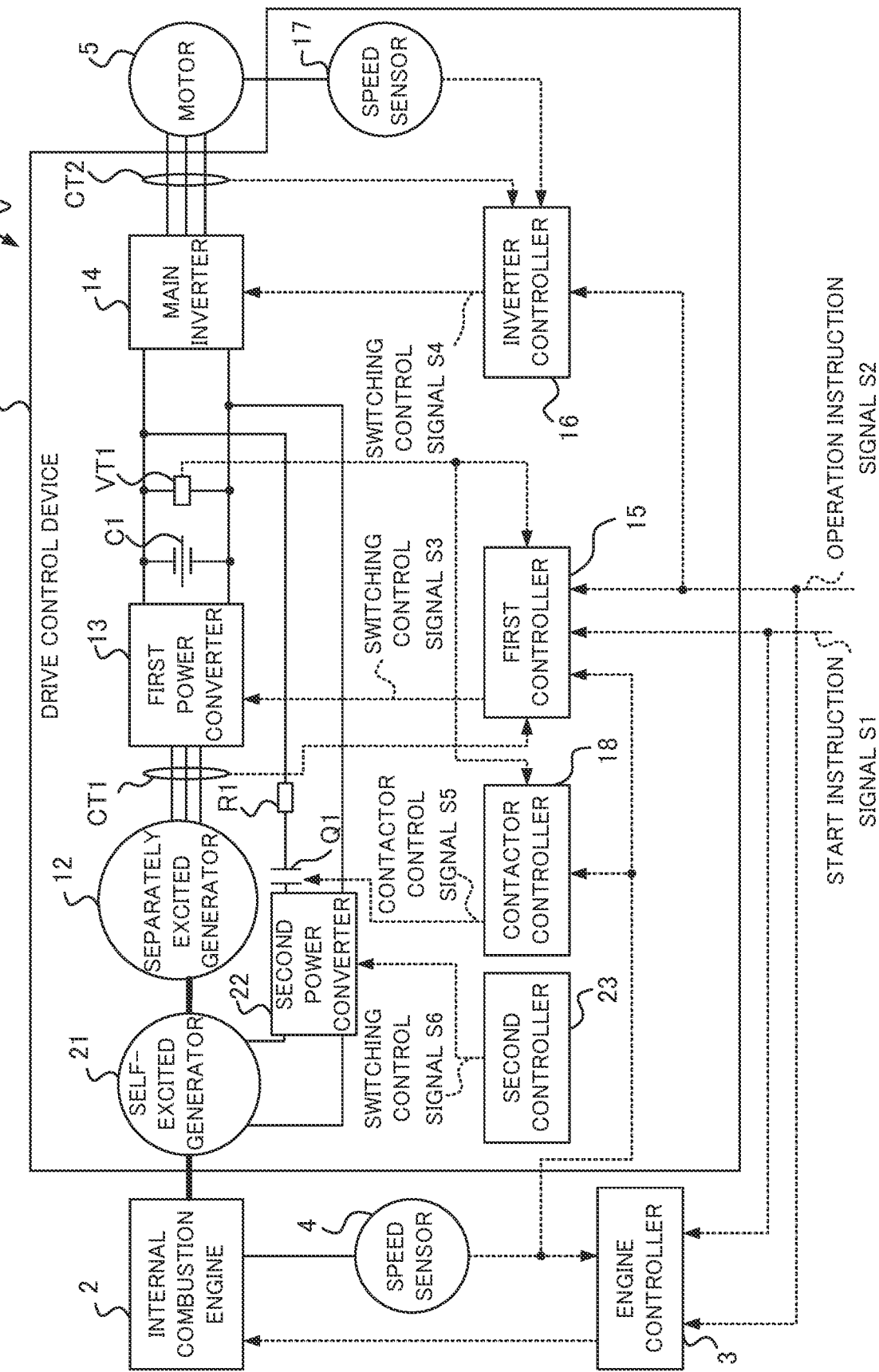
FIG. 7 is a block diagram illustrating a configuration of a driving apparatus for a railway vehicle according to Embodiment 3 of the present disclosure.

The drive control devices 10 and 20 may have any circuit configuration provided that the capacitor C1 can be charged with electric power generated at the self-excited generator 11 and the electric power fed from the capacitor C1 can excite the separately excited generator 12. A drive control device 30 according to Embodiment 3 illustrated in FIG. 7 includes a self-excited generator 21. The drive control device 30 further includes a second power converter 22 and a second controller 23 to control the second power converter 22, in addition to the configuration of the drive control device 20. The second power converter 22 has primary terminals connected to the self-excited generator 21 and secondary terminals one of which is connected to one end of the contactor Q1. The second power converter 22 converts the AC power fed from the self-excited generator 21 into DC power and outputs the DC power. The drive control device 30 has the structure identical to that of the drive control device 20, except for the self-excited generator 21, the second power converter 22, and the second controller 23.

The self-excited generator 21 includes an AC generator. The input shaft of the self-excited generator 21 is coupled to the output shaft of the internal combustion engine 2. The self-excited generator 21 generates AC power and outputs the generated AC power by being driven by the internal combustion engine 2. The output terminals of the self-excited generator 21 are connected to the primary terminals of the second power converter 22.

The second power converter 22 converts the AC power fed from the self-excited generator 21 via the primary terminals into DC power and outputs the DC power via the secondary terminals. The electric power output from the second power converter 22 charges the capacitor C1.

The second controller 23 outputs a switching control signal S6 to the second power converter 22, and thus controls the timings of turning on and off a plurality of switching elements of the second power converter 22. Specifically, the second controller 23 acquires the actual rotation frequency of the internal combustion engine 2 from the speed sensor 4. When the actual rotation frequency of the internal combustion engine 2 reaches a threshold rotation frequency, the second controller 23 controls the timings of turning on and off the switching elements of the second power converter 22, and thus causes the second power converter 22 to start the power conversion process of converting the AC power fed via the primary terminals into DC power. The threshold rotation frequency is defined as the rotation frequency of the internal combustion engine 2 when the self-excited generator 11 is driven by the internal combustion engine 2 to start power generation after the start of the internal combustion engine 2, for example.

The second controller 23 also acquires the voltage EFC between the terminals of the capacitor C1 from the voltage measurer VT1. When the voltage EFC between the terminals of the capacitor C1 becomes at least the threshold voltage EFC1, the second controller 23 outputs a switching control signal S6 for turning off the switching elements of the second power converter 22, and thereby stops the second power converter 22.

An operation of the driving apparatus 1 having the above-described configuration is described below with reference to the timing chart in the sections (A) to (H) of FIG. 8. The sections (A) to (G) of FIG. 8 correspond to the respective sections (A) to (G) of FIG. 5. As in FIG. 5, the start instruction signal S1 is switched from the L level to the H level at the time T1.

Figure 8:
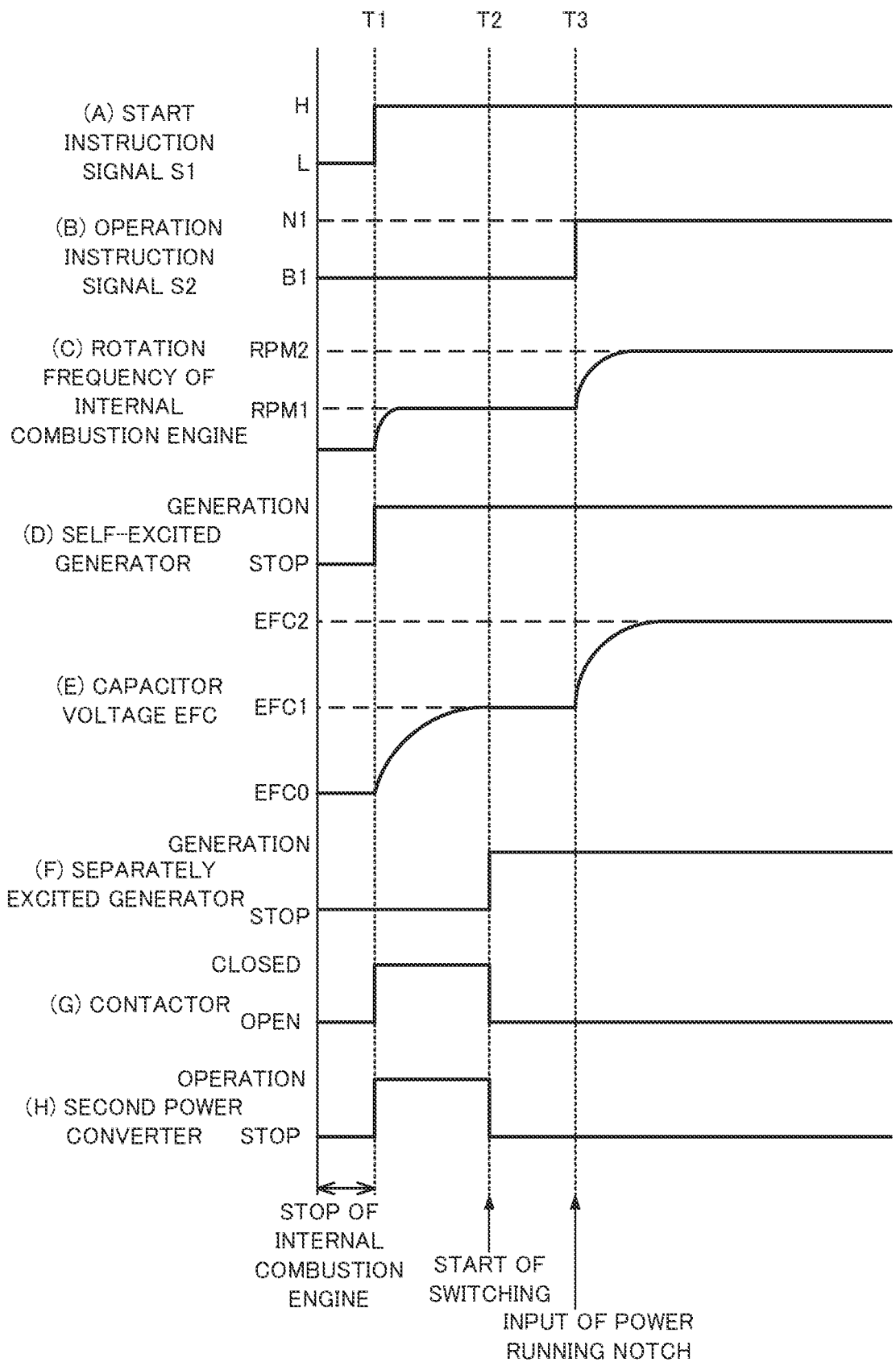
FIG. 8 is a timing chart illustrating a process of exciting a separately excited generator executed in the driving apparatus for a railway vehicle according to Embodiment 3.
Figure 9:
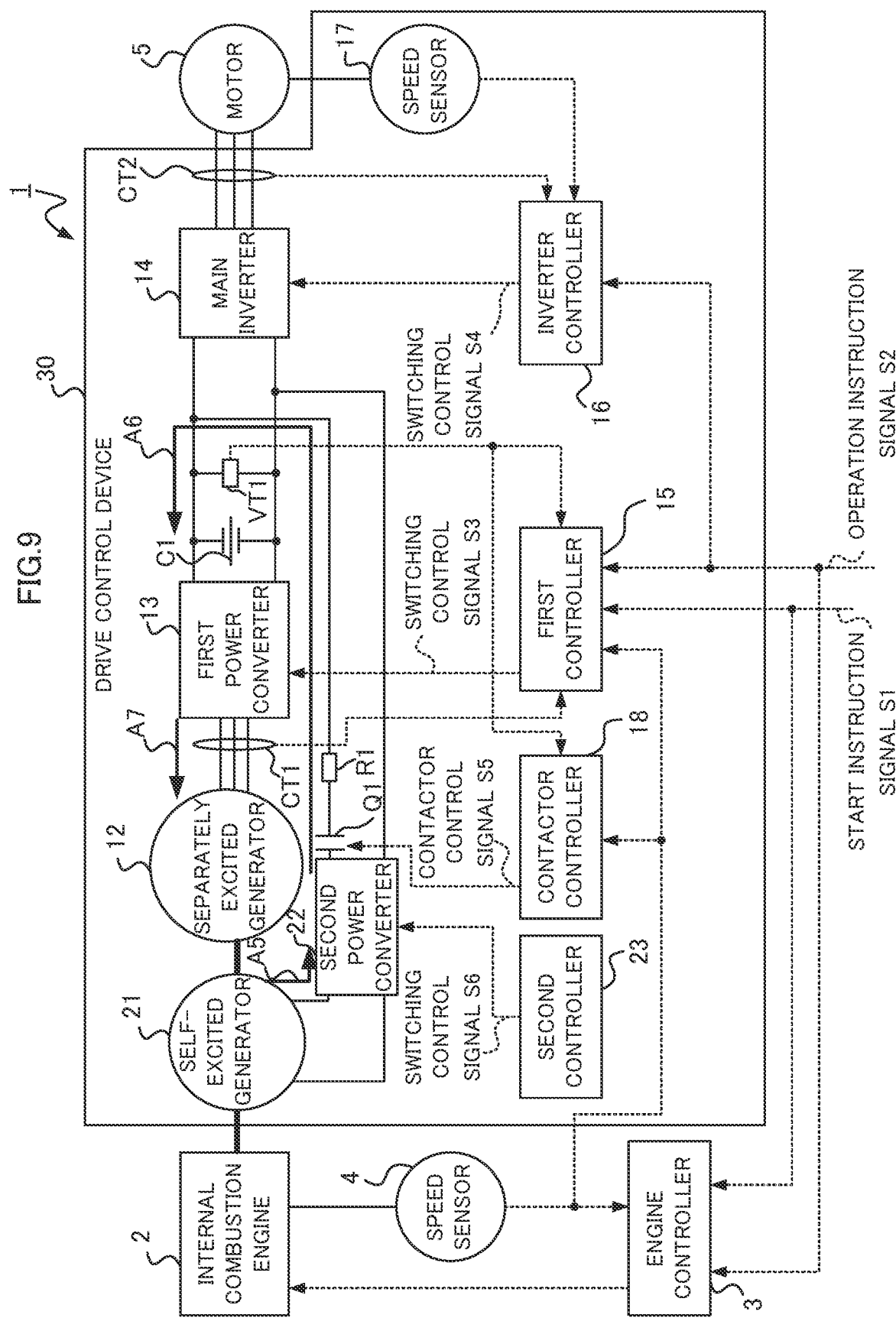
FIG. 9 illustrates an example of current flows in the driving apparatus for a railway vehicle according to Embodiment 3.

As illustrated in the section (C) of FIG. 8, the engine controller 3 starts the internal combustion engine 2 in response to the switching of the start instruction signal S1 from the L level to the H level at the time T1. The rotation frequency of the internal combustion engine 2 thus starts to rise from the rotation frequency RPM0. As illustrated in the section (D) of FIG. 8, the self-excited generator 21 starts power generation in accordance with the increase in the rotation frequency of the internal combustion engine 2. Accordingly, a current flows from the self-excited generator 21 to the second power converter 22 as represented by the solid-line arrow A5 in FIG. 9.

As illustrated in the section (H) of FIG. 8, the second controller 23 starts to control the timings of turning on and off the plurality of switching elements of the second power converter 22 at the time T1, and thus causes the second power converter 22 to convert the AC power generated at the self-excited generator 21 into DC power, in order to charge the capacitor C1 with electric power generated at the self-excited generator 21. As illustrated in the section (G) of FIG. 8, the contactor controller 18 closes the contactor Q1 at the time T1. Accordingly, a current flows from the second power converter 22 to the capacitor C1 as represented by the solid-line arrow A6 in FIG. 9, thereby charging the capacitor C1. As illustrated in the section (E) of FIG. 8, the electric power generated at the self-excited generator 21 charges the capacitor C1, and the voltage EFC between the terminals of the capacitor C1 starts to rise from the voltage EFC0. As illustrated in the section (F) of FIG. 8, the separately excited generator 12 has not been excited and thus does not start power generation regardless of being driven by the internal combustion engine 2.

As illustrated in the section (E) of FIG. 8, when the voltage EFC between the terminals reaches the threshold voltage EFC1 at the time T2, the first controller 15 starts to control the on and off states of the switching elements of the first power converter 13, and thus causes the first power converter 13 to convert the DC power fed from the capacitor C1 into AC power and feed the AC power to the separately excited generator 12. Accordingly, a current flows from the first power converter 13 to the separately excited generator 12 as represented by the solid-line arrow A7 in FIG. 9, thereby exciting the separately excited generator 12. As illustrated in the section (F) of FIG. 8, after the excitation of the separately excited generator 12 at the time T2, the separately excited generator 12 driven by the internal combustion engine 2 starts power generation. The separately excited generator 12 then feeds the generated AC power to the first power converter 13.

When the voltage EFC between the terminals reaches the threshold voltage EFC1 at the time T2, as illustrated in the section (H) of FIG. 8, the second controller 23 turns off the switching elements of the second power converter 22, and thereby stops the second power converter 22. As illustrated in the section (G) of FIG. 8, the contactor controller 18 opens the contactor Q1 at the time T2.

The stop of the second power converter 22 preferably precedes the opening of the contactor Q1. In this case, the contactor controller 18 may acquire the switching control signal S6 and detect that the second controller 23 has stopped the second power converter 22, and then open the contactor Q1.

The following steps are identical to those in Embodiment 1.

As described above, in the drive control device 30 according to Embodiment 3, the first power converter 13 converts the DC power, which is fed from the capacitor C1 charged with electric power generated at the self-excited generator 21 including an AC generator, into AC power and feeds the AC power to the separately excited generator 12, leading to excitation of the separately excited generator 12. The drive control device 30 therefore requires no electric storage device to excite the separately excited generator 12. The self-excited generator 21 may be such a small generator that can generate at least electric power for exciting the separately excited generator 12. This configuration can reduce the sizes of the drive control device 30 and the driving apparatus 1.

The above-described embodiments are not to be construed as limiting the scope of the present disclosure. The above-described circuit configurations of the drive control devices 10, 20, and 30 are mere examples. The drive control devices 10, 20, and 30 may have any circuit configuration provided that the electric power generated at the self-excited generator 11 or 21 can excite the separately excited generator 12.

In one example, the drive control device 30 may exclude the contactor Q1, like the drive control device 10.

The device to which the driving apparatus 1 feeds electric power, in other words, the load connected to the secondary terminals of the main inverter 14 is not necessarily the motor 5 and may be an in-vehicle device, such as air conditioner or lighting equipment. In this case, the main inverter 14 may include a constant voltage constant frequency (CVCF) inverter.

The drive control devices 20 and 30 may include any element to electrically connect the capacitor C1 to the self-excited generator 11 or 21, or electrically disconnect the capacitor C1 from the self-excited generator 11 or 21, instead of the contactor Q1.

The drive control device 30 may include a diode bridge for full-wave rectification of the AC power output from the self-excited generator 21, instead of the second power converter 22.

The above-described control by the first controller 15 is a mere example. In another example, the first controller 15 may adjust the switching elements of the first power converter 13 by means of feedback of the current output from the first power converter 13. The above-described control by the inverter controller 16 is a mere example. The drive control devices 10, 20, and 30 may exclude the speed sensor 17, and the inverter controller 16 may acquire the rotation frequency of the motor 5 from an automatic train control (ATC). The inverter controller 16 may then execute sensor-less vector control for estimating a rotational speed of the motor 5.

The above-described control by the contactor controller 18 is a mere example. In another example, the contactor controller 18 may close the contactor Q1 after the lapse of a predetermined period since the actual rotation frequency of the internal combustion engine 2 reaches the threshold rotation frequency. Alternatively, the contactor controller 18 may acquire the start instruction signal S1, and close the contactor Q1 after the lapse of a predetermined period since the start instruction signal S1 is switched to the H level.

In another example, the contactor controller 18 may open the contactor Q1 when the voltage EFC between the terminals of the capacitor C1 has been at least the threshold voltage EFC1 for a predetermined time or longer.

Although the current measurers CT1 and CT2 detect all the U-, V-, and W-phase currents in the above description, the current measurers CT1 and CT2 are only required to detect at least two of the U-, V-, and W-phase currents.

The drive control devices 10, 20, and 30 may further include a clutch and a clutch controller to control the clutch. This clutch mechanically connects the self-excited generator 11 to the internal combustion engine 2, or mechanically disconnects the self-excited generator 11 from the internal combustion engine 2. In this case, the clutch controller may acquire the phase currents measured at the current measurer CT1, and cause the clutch to mechanically disconnect the self-excited generator 11 from the internal combustion engine 2 when the amplitude of the phase currents becomes at least a threshold amplitude. Thereafter, when the internal combustion engine 2 is stopped and then restarted, the clutch controller may cause the clutch to mechanically connect the self-excited generator 11 to the internal combustion engine 2.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST

1 Driving apparatus for a railway vehicle
2 Internal combustion engine
3 Engine controller
4, 17 Speed sensor
5 Motor
10, 20, 30 Drive control device
11, 21 Self-excited generator
12 Separately excited generator
13 First power converter
14 Main inverter
15 First controller
16 Inverter controller
18 Contactor controller
22 Second power converter
23 Second controller
B1 Braking notch
C1 Capacitor
CT1, CT2 Current measurer
EFC Voltage between terminals
EFC0, EFC2 Voltage
EFC1 Threshold voltage
N1 Power running notch
Q1 Contactor
R1 Resistor
RPM0, RPM1, RPM2 Rotation frequency
S1 Start instruction signal
S2 Operation instruction signal
S3, S4, S6 Switching control signal
S5 Contactor control signal
VT1 Voltage measurer

The invention claimed is:

1. A drive control device comprising:
a self-excited generator coupled to an internal combustion engine, and configured, by being driven by the internal combustion engine, to generate electric power and output the generated electric power;
a separately excited generator coupled to the internal combustion engine, the separately excited generator in an excited state being configured, by being driven by the internal combustion engine, to generate electric power and output the generated electric power;
a first power converter to convert electric power fed from the separately excited generator via primary terminals into direct current (DC) power and output the DC power via secondary terminals after start of power generation at the separately excited generator, and to convert DC power fed via the secondary terminals into electric power to be fed to the separately excited generator and output the electric power via the primary terminals to excite the separately excited generator; and
a capacitor connected between the secondary terminals of the first power converter, wherein
the self-excited generator has output terminals connected to the capacitor.

2. The drive control device according to claim 1, further comprising:
a first controller to control switching elements included in the first power converter, wherein
the first controller controls the switching elements, and thereby causes the first power converter to convert the DC power fed via the secondary terminals from the capacitor into electric power to be fed to the separately excited generator and feed the electric power to the separately excited generator via the primary terminals, the capacitor being charged with the electric power output from the self-excited generator, and after the separately excited generator is excited by the electric power fed from the first power converter, the first controller controls the switching elements, and thereby causes the first power converter to convert the electric power fed from the separately excited generator via the primary terminals into DC power and output the DC power via the secondary terminals.

3. The drive control device according to claim 2, wherein the self-excited generator has a generation capacity lower than a generation capacity of the separately excited generator.

4. The drive control device according to claim 3, further comprising:
a contactor having one end connected to the self-excited generator and the other end connected to the capacitor; and
a contactor controller to control the contactor, wherein the contactor controller closes the contactor after start of the internal combustion engine.

5. The drive control device according to claim 2, further comprising:
a contactor having one end connected to the self-excited generator and the other end connected to the capacitor; and
a contactor controller to control the contactor, wherein the contactor controller closes the contactor after start of the internal combustion engine.

6. The drive control device according to claim 5, wherein the contactor controller opens the contactor when a voltage between terminals of the capacitor is greater than or equal to a threshold voltage.

7. The drive control device according to claim 2, wherein the self-excited generator comprises a DC generator coupled to the internal combustion engine, the DC generator being configured, by being driven by the internal combustion engine, to generate DC power and output the generated DC power.

8. The drive control device according to claim 2, wherein the self-excited generator comprises an alternating current (AC) generator coupled to the internal combustion engine, the AC generator being configured to, by being driven by the internal combustion engine, generate AC power and output the generated AC power, and
the drive control device further comprises a second power converter to convert the AC power fed from the self-excited generator into DC power and feed the converted DC power to the capacitor.

9. The drive control device according to claim 1, wherein the self-excited generator has a generation capacity lower than a generation capacity of the separately excited generator.

10. The drive control device according to claim 9, further comprising:
a contactor having one end connected to the self-excited generator and the other end connected to the capacitor; and
a contactor controller to control the contactor, wherein the contactor controller closes the contactor after start of the internal combustion engine.

11. The drive control device according to claim 10, wherein the contactor controller opens the contactor when a voltage between terminals of the capacitor is greater than or equal to a threshold voltage.

12. The drive control device according to claim 9, wherein the self-excited generator comprises a DC generator coupled to the internal combustion engine, the DC generator being configured, by being driven by the internal combustion engine, to generate DC power and output the generated DC power.

13. The drive control device according to claim 9, wherein
the self-excited generator comprises an alternating current (AC) generator coupled to the internal combustion engine, the AC generator being configured to, by being driven by the internal combustion engine, generate AC power and output the generated AC power, and
the drive control device further comprises a second power converter to convert the AC power fed from the self-excited generator into DC power and feed the converted DC power to the capacitor.

14. The drive control device according to claim 1, further comprising:
a contactor having one end connected to the self-excited generator and the other end connected to the capacitor; and
a contactor controller to control the contactor, wherein the contactor controller closes the contactor after start of the internal combustion engine.

15. The drive control device according to claim 14, wherein the contactor controller opens the contactor when a voltage between terminals of the capacitor is greater than or equal to a threshold voltage.

16. The drive control device according to claim 14, wherein the self-excited generator comprises a DC generator coupled to the internal combustion engine, the DC generator being configured, by being driven by the internal combustion engine, to generate DC power and output the generated DC power.

17. The drive control device according to claim 14, wherein
the self-excited generator comprises an alternating current (AC) generator coupled to the internal combustion engine, the AC generator being configured to, by being driven by the internal combustion engine, generate AC power and output the generated AC power, and
the drive control device further comprises a second power converter to convert the AC power fed from the self-excited generator into DC power and feed the converted DC power to the capacitor.

18. The drive control device according to claim 1, wherein the self-excited generator comprises a DC generator coupled to the internal combustion engine, the DC generator being configured, by being driven by the internal combustion engine, to generate DC power and output the generated DC power.

19. The drive control device according to claim 1, wherein
the self-excited generator comprises an alternating current (AC) generator coupled to the internal combustion engine, the AC generator being configured to, by being driven by the internal combustion engine, generate AC power and output the generated AC power, and
the drive control device further comprises a second power converter to convert the AC power fed from the self-excited generator into DC power and feed the converted DC power to the capacitor.

20. A driving apparatus for a railway vehicle, the driving apparatus comprising:
an internal combustion engine;
the drive control device according to claim 1; and
a main inverter having primary terminals between which the capacitor included in the drive control device is connected and secondary terminals, the main inverter being configured to (i) convert DC power fed from the capacitor via the primary terminals into electric power to be fed to a load, and (ii) feed the converted electric power via the secondary terminals to the load.

* * * * *